(12) United States Patent
Stiemens

(10) Patent No.: US 9,378,360 B2
(45) Date of Patent: Jun. 28, 2016

(54) SECURE IF ANTECEDENT

(71) Applicant: FLEXERA SOFTWARE LLC, Itasca, IL (US)

(72) Inventor: Alan Walter Stiemens, Reading (GB)

(73) Assignee: FLEXERA SOFTWARE LLC, Itasca, IL (US)

( * ) Notice: Subject to any disclaimer, the term of this patent is extended or adjusted under 35 U.S.C. 154(b) by 113 days.

(21) Appl. No.: 14/313,902

(22) Filed: Jun. 24, 2014

(65) Prior Publication Data

US 2015/0371037 A1    Dec. 24, 2015

(51) Int. Cl.
*G06F 11/00* (2006.01)
*G06F 21/54* (2013.01)

(52) U.S. Cl.
CPC ..................................... *G06F 21/54* (2013.01)

(58) Field of Classification Search
CPC ..... G06F 21/57; G06F 21/53; G06F 21/6218; G06F 21/51; G06F 21/64; G06F 21/72; H04L 63/1416; H04L 63/1408; H04L 63/145
USPC .......................................................... 726/22
See application file for complete search history.

(56) References Cited

U.S. PATENT DOCUMENTS

| | | | |
|---|---|---|---|
| 6,880,083 B1 * | 4/2005 | Korn ............................. | 713/170 |
| 8,490,052 B2 * | 7/2013 | Shukla et al. ................. | 717/117 |
| 2009/0049308 A1 * | 2/2009 | Jin et al. ........................ | 713/187 |
| 2014/0012963 A1 * | 1/2014 | Swenson et al. .............. | 709/220 |

* cited by examiner

*Primary Examiner* — Ali Abyaneh
(74) *Attorney, Agent, or Firm* — Michael A. Glenn; Perkins Coie LLP

(57) ABSTRACT

Hostile attacks against a computer program are prevented when the program is executed in a computing environment that is controlled by the attacker. A preposition is run in a secure computing environment instead of the original call site, i.e. the IF antecedent, which has a TRUE consequence and a FALSE consequence are run in a secure computing environment. Embodiments of the invention also allow an insecure call site to detect modifications by a hostile attacker surreptitiously. In embodiments of the invention, a script is generated by a script generator from the IF antecedent and TRUE and FALSE consequence source code, for example relative to a call site. The original source code is modified to call the script engine, rather than the preposition. At run-time a script engine executes this script.

23 Claims, 7 Drawing Sheets

SECURE IF ANTECEDENT

FIELD

The invention relates to computer security. More particularly, the invention relates to preventing hostile attacks against a computer program when the program is executed in a computing environment that is controlled by the attacker.

BACKGROUND

It is relatively simple for a hostile attacker to thwart the intentions of the author of a computer program when the program is executed in a computing environment that is controlled by the attacker. Digital signature checks can be skipped and object code modified. For example, a piece of source code that is written to check that the computer program has been purchased could consist of the preposition: "if purchased, run or else fail." An attacker can alter the object code to jump straight to the true consequence even if the antecedent is false.

SUMMARY

Embodiments of the invention prevent hostile attacks against a computer program when the program is executed in a computing environment that is controlled by the attacker. A preposition is run in a secure computing environment instead of the original call site, i.e. an IF antecedent, which has a TRUE consequence and a FALSE consequence is run in a secure computing environment. Embodiments of the invention also allow an insecure call site to detect modifications by a hostile attacker surreptitiously.

In embodiments of the invention, a script is generated by a script generator from the IF antecedent and TRUE and FALSE consequence source code, for example relative to a call site. The original source code is modified to call the script engine, rather than the preposition. At run-time a script engine executes this script.

DETAILED DESCRIPTION

Embodiments of the invention prevent hostile attacks against a computer program when the program is executed in a computing environment that is controlled by the attacker. Embodiments of the invention also allow an insecure call site to detect modifications by a hostile attacker surreptitiously. Applications of the invention include entitlement enforcement, activity monitors, game play, system safety checks, etc. on any of smart phones and devices and desktops. The invention is useful anywhere where there is an opportunity for an attacker to gain an unfair advantage by modifying software.

Figure 1:
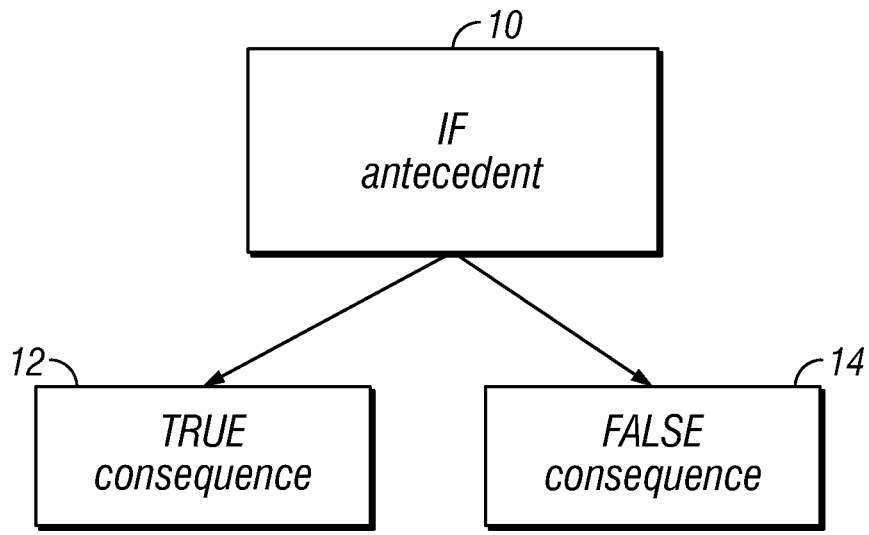
FIG. 1 is a block schematic diagram showing an IF antecedent having a TRUE and FALSE consequence.

FIG. 1 is a block schematic diagram showing an IF antecedent having a TRUE and FALSE consequence. The IF antecedent can be best thought of as an IF statement, in which a first condition is TRUE, i.e. if an expected value is received or an expected call is made in the proper way, then the program receives an expected response and execution proceeds; and if a value other than an expected value is received, then the program has been compromised and an action is taken, such as returning program execution to a start instruction.

Accordingly, embodiments of the invention run a preposition in a secure computing environment instead of the original call site, i.e. an IF antecedent 10, which has a TRUE consequence 12 and a FALSE consequence 14 is called from an executing program and run in a secure computing environment. An expected result is a TRUE consequence; an unexpected result, for example as may be attributed to an attack, is a FALSE consequence.

Figure 2:
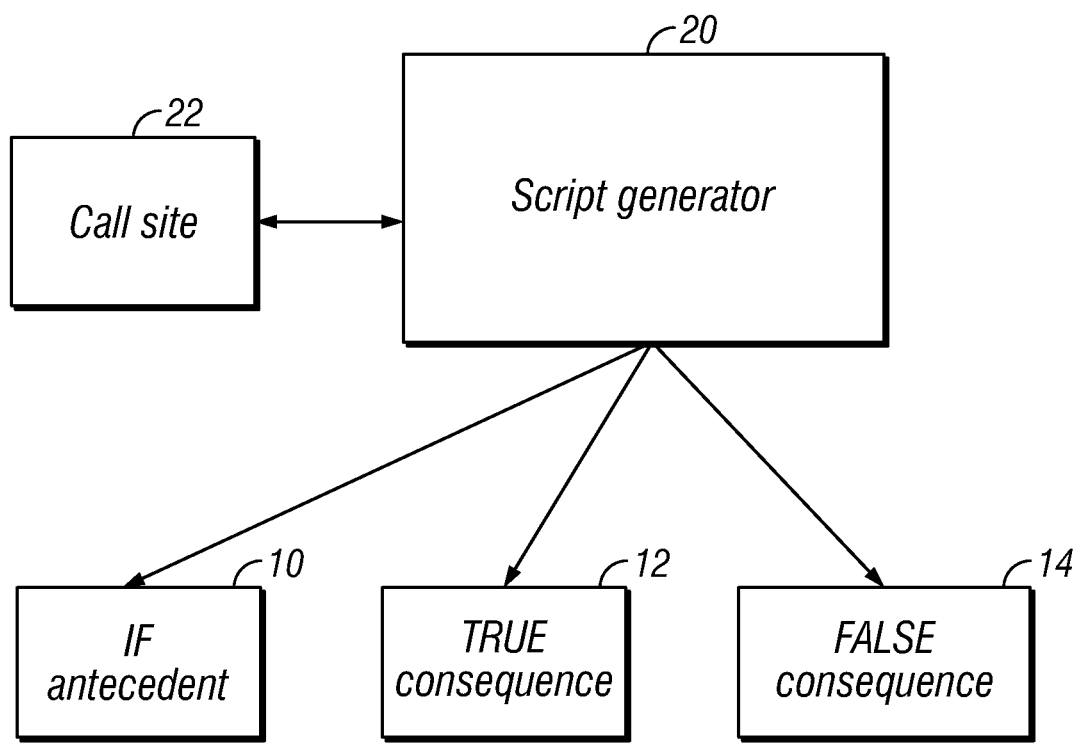
FIG. 2 is a block schematic diagram showing the generation of a script from antecedent and consequence source code according to the invention.

FIG. 2 is a block schematic diagram showing the generation of a script from antecedent and consequence source code according to the invention. In embodiments of the invention, a script is generated by a script generator 20 from the IF antecedent 10 and TRUE and FALSE consequence 12, 14 source code, for example relative to a call site 22, such as an executing computer program. The original source code is modified by the author to call the script engine, rather than the preposition. At run-time a script engine executes this script. In embodiments of the invention the script engine could be, but is not limited to, a software interpreter and the secure environment could be, but is not limited to, a secure processor or other secure processing environment.

The script can also define the actions that should be executed after processing the antecedent. For example, the script could instruct the engine to validate its own address space, or another module for modification. Embodiments of the invention thus detect, for example, tampering and take a deterministic action when such tampering is detected. This approach is fault tolerant in that the antecedent determines a correct path, based upon execution of the script. Attacks are treated as errors. Thus, either a TRUE path or a FALSE path is a correct path, but each path indicates compliant execution of the program, i.e. the TRUE path, or deviant program behaviour associated with an attack, i.e. the FALSE path.

A script generator run in a computing environment controlled by the author is used to generate the run-time script. In embodiments of the invention, the script is encrypted using standard symmetric encryption algorithms with the key defined by the author in the code generation script. The key for the decryption is embedded in the boot loader. Thus, pre-processing occurs in which the script is declared as a data field in the native source code of the program. A series of keys are added in a post-processing phase, i.e. the script generates aliases for values that are difficult to know. The pre-process, generated, shared secret keys, are stored in the data field in the native source code, as well as in the source code header files of the native code. Additional keys that are stored in the boot loader are injected into the application as part of the post build process. This build process is discussed in greater detail below.

Actions taken in response to the execution of the script are a function of entry and exit to the secure environment. Thus, embodiments of the invention check sections of the code during runtime for unauthorized modifications. The program calls the antecedent and an action is taken, such as a checksum of the native code, and the script determines if the code has changed. Thus, a check value may be applied, where the value is inside the secure engine, and where the value is modified depending on proper progress of the code. The value is used to ensure that various consequences, such as authorization, do not occur unless they are desired. In this way, the script serves a role akin to that of a gatekeeper.

The native code thus calls into the script and the script returns a value indicating that it ran properly. The native code, for example, can provide a check value to the script and wait for the script to return a value that is expected upon proper completion of the script. This process can take place repeatedly during execution of the program with a series of calls to the script in the secure environment, where the value is repeatedly changed and where a different, expected value is returned after each call to the antecedent and thus to the script. At the end of this process, a correct value is returned. If not, the program can be forced to follow a proper path. For example, if the program has been hacked, then the correct path is to instruct the program to exit. Thus, rather than bypass a needed step in authorizing use of a program, the program is forced to, for example, return to a start screen, and is not allowed to progress to an operative state. In other embodiments, an action may be taken to provide an alert to a system administrator that a user is trying to compromise the program.

The antecedent and consequences are not called directly from the modified source code, and are only called by the script engine. Because the script engine has no knowledge of the call backs, there is no advantage in statically analysing the code to see the control flow. In fact, a complete static analysis of the code would show an orphaned function for the consequence.

For additional security, an obfuscated script engine with changeable operation codes could be used. The engine could be configured to understand only code that has been compiled and encrypted by the author.

A script can be generated from the source code of the preposition to call back to the source code for parts of the code that cannot be converted to script when run in a script engine, for example, calls to external modules, such as system calls and calls to third party modules. For additional security, an attack on the call back can be mitigated against by including additional call backs where a negative or different result is expected.

The script engine evaluates the results of the antecedent and calls the TRUE or FALSE consequence. It should be noted that the consequence is also able to call the script engine. Moreover, the script engine could verify that the object code has not been modified since being launched. For additional security the engine could also check that the code has been modified to a new, expected known value.

Further inter-locking of the antecedent and the consequence is achieved by retaining state in the script engine. This state is incrementally modified by each stage of the antecedent and call back. The state is then used in the consequence to perform some critical task, such that even if verification that the object code has not been modified is thwarted, or the antecedent is modified or bypassed, the consequence still behaves in an incorrect or unexpected fashion controlled by the author.

For additional security the antecedent or the consequence could make further calls to test some other antecedent and alter behaviour based on the success or otherwise of these calls.

For additional security the generated script can follow a different execution path on each invocation, making it hard for an attacker to compare the code flow in the engine.

For added security, the engine contains a state item that can be addressed by multiple externally unrelated aliases. This makes it hard for an attacker to know which state item is being operated on at any instance.

Use Cases

Use Case #1

Attack: The attacker modifies the object code to not call the engine, and instead call the desired consequence directly.

Result: The consequence would not work because the modifications of the state, required by the consequence will not have been made by the engine.

Use Case #2

Attack: The attacker modifies the object code to not call the engine, and instead call the antecedent and desired consequence directly.

Result: The consequence would not work because the state of the engine, required by the consequence has not been set. This use case occurs if some result from the antecedent is required by the consequence.

Use Case #3

Attack: The attacker modifies the object code to fool the engine to think the memory has not been tampered with and then calls the antecedent and desired consequence directly.

Result: The consequence would not work because the state of the engine, required by the consequence has not been set.

While embodiments of the invention use license availability as an example preposition, the invention is equally applicable to any preposition where the author of the preposition does not want it to be thwarted but a hostile attacker does want to thwart it. Other examples are prepositions which enforce policy restrictions, those that perform system safety checks, or those which monitor activity. The invention can also be used to thwart an attacker's attempt to increase their game high score and thus ruin the competitive environment for other players.

Build Process

Figure 3:
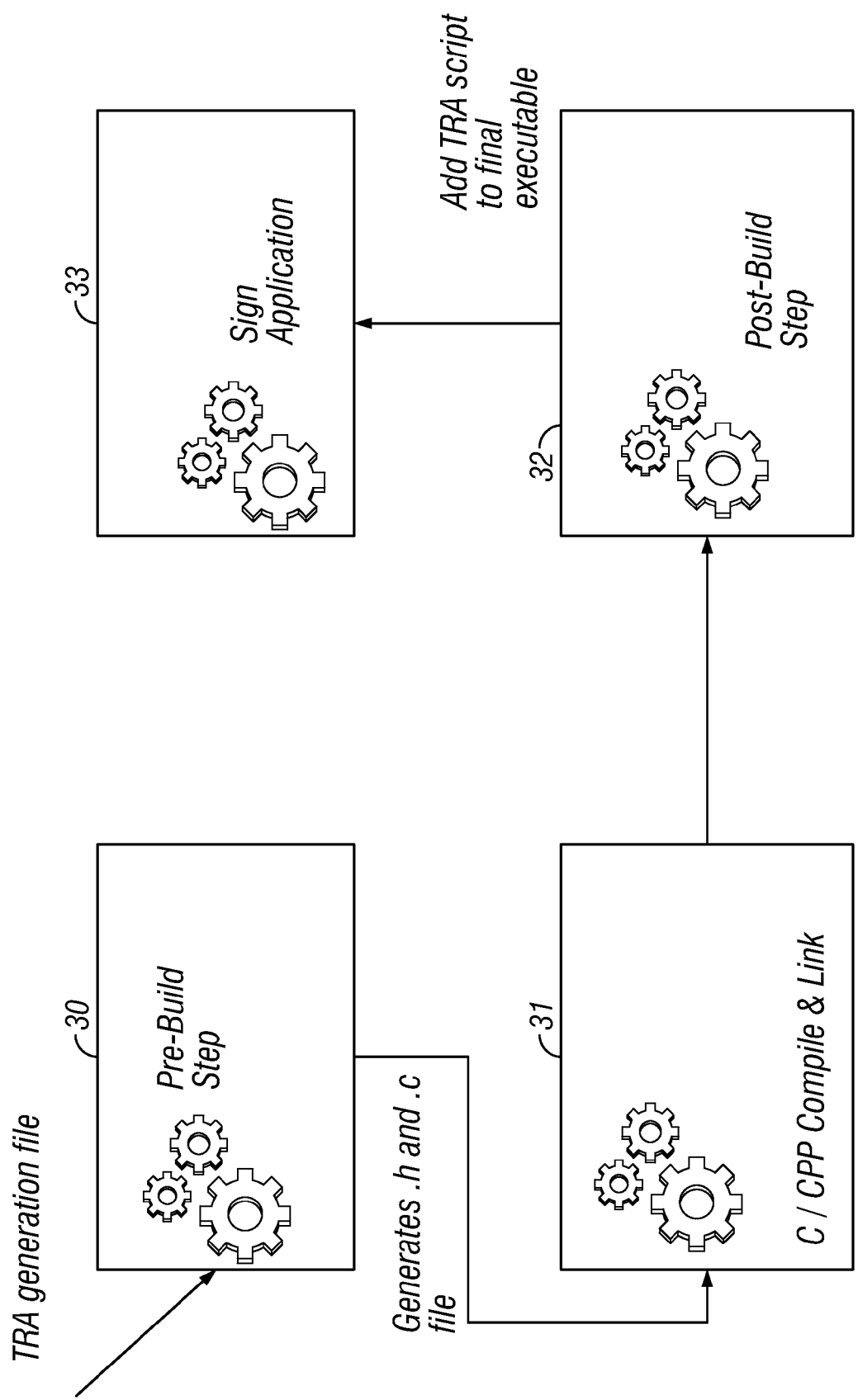
FIG. 3 is a block schematic showing implementation of an IF antecedent according to the invention.

FIG. 3 is a block schematic showing implementation of an IF antecedent according to the invention. Embodiments of the invention are implemented in three phases including pre-build, compilation, and post build. In a first, pre-build phase 30, a script is prepared in which the antecedent and consequences of the IF statement are declared, and any actions that may be taken are defined, e.g. perform a checksum. During a second, compilation phase 31, the antecedent is compiled as a call, for example, into a library or to a network asset. During a third, post-build phase 32, references to the antecedent are stripped, i.e. unnecessary information is removed from executable binary programs and object files. The address of the antecedent is only known to a secure environment. Because there is no reference to the antecedent in the native code, a static analysis does not reveal the antecedent. Finally, the application can be signed 33.

The pre-build phase uses a TRA file to generate a header and a C file. The generated C file is added to the list of source files that are compiled into the application. The header file includes, for example, one or more generated function prototypes, predefined alias values, shared secret keys, an array of functions that might be referenced by the TRA engine, encrypted byte code used by the script engine, and a reserved data area for the boot-loader.

The post-build process generates the boot-loader byte code and injects it into the reserved data area. This step also strips the references to the functions called by the TRA engine.

Figure 4:
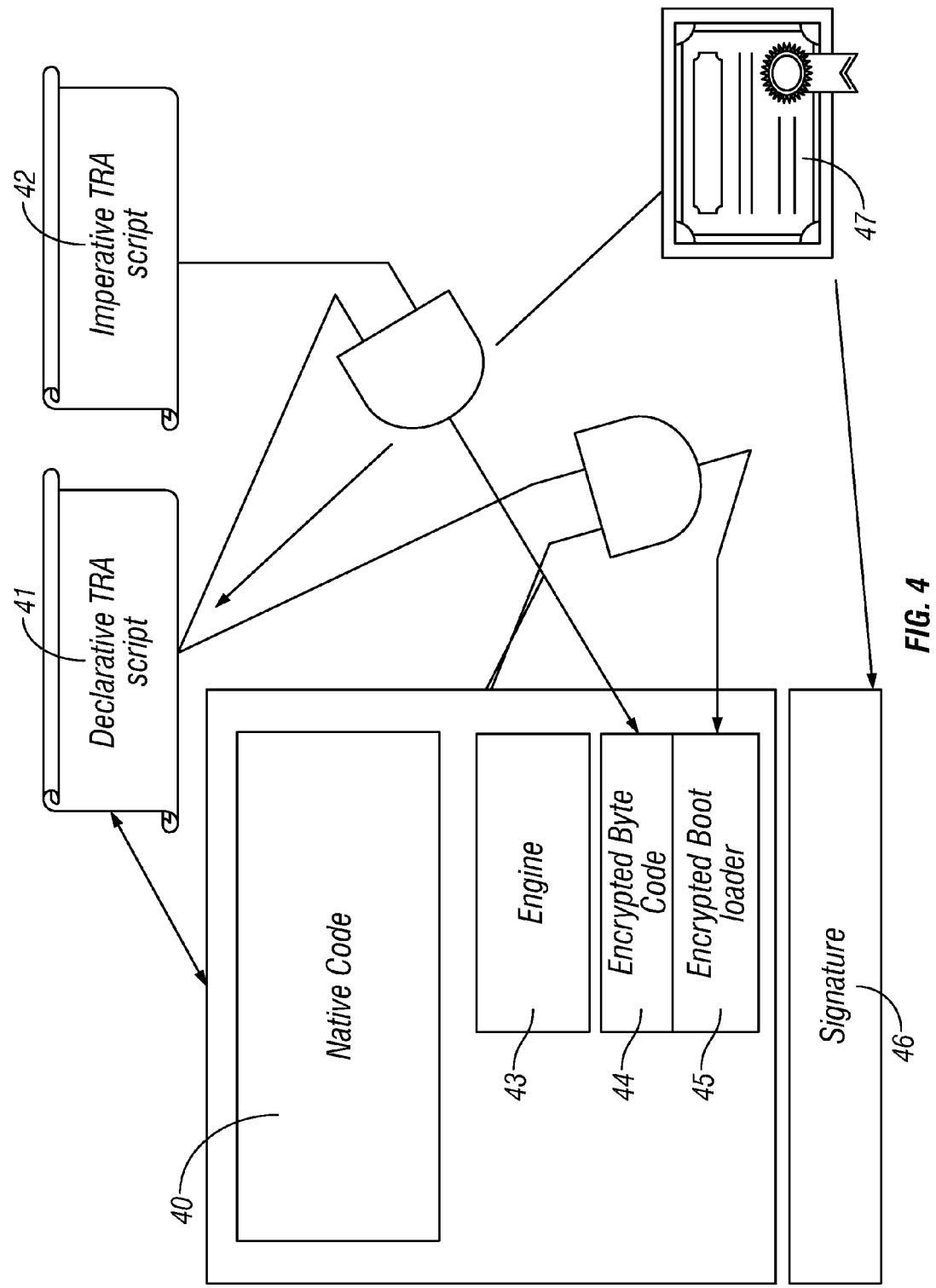
FIG. 4 is a block schematic diagram showing the components of an IF antecedent script according to the invention.

FIG. 4 is a block schematic diagram showing the components of an IF antecedent script according to the invention. A TRA enabled application consists of the native code 40 and a linked in protection engine 43. A declarative data file 41 defines the configuration used to generate the scripts that are used to control the protection engine. Certificate details can also be specified in the declarative script. The engine generates a header file that is used by the native code to access items in the engine. An imperative script 42 is compiled and encrypted as byte code 44 that is built into the application. As part of the post-build phase, the native code is check summed and a bootloader loader 45 is injected into the application. Finally the code can be signed 46. This signature can now be certified 47 by the OS as well as at runtime by the application itself.

EXAMPLES

Figure 5:
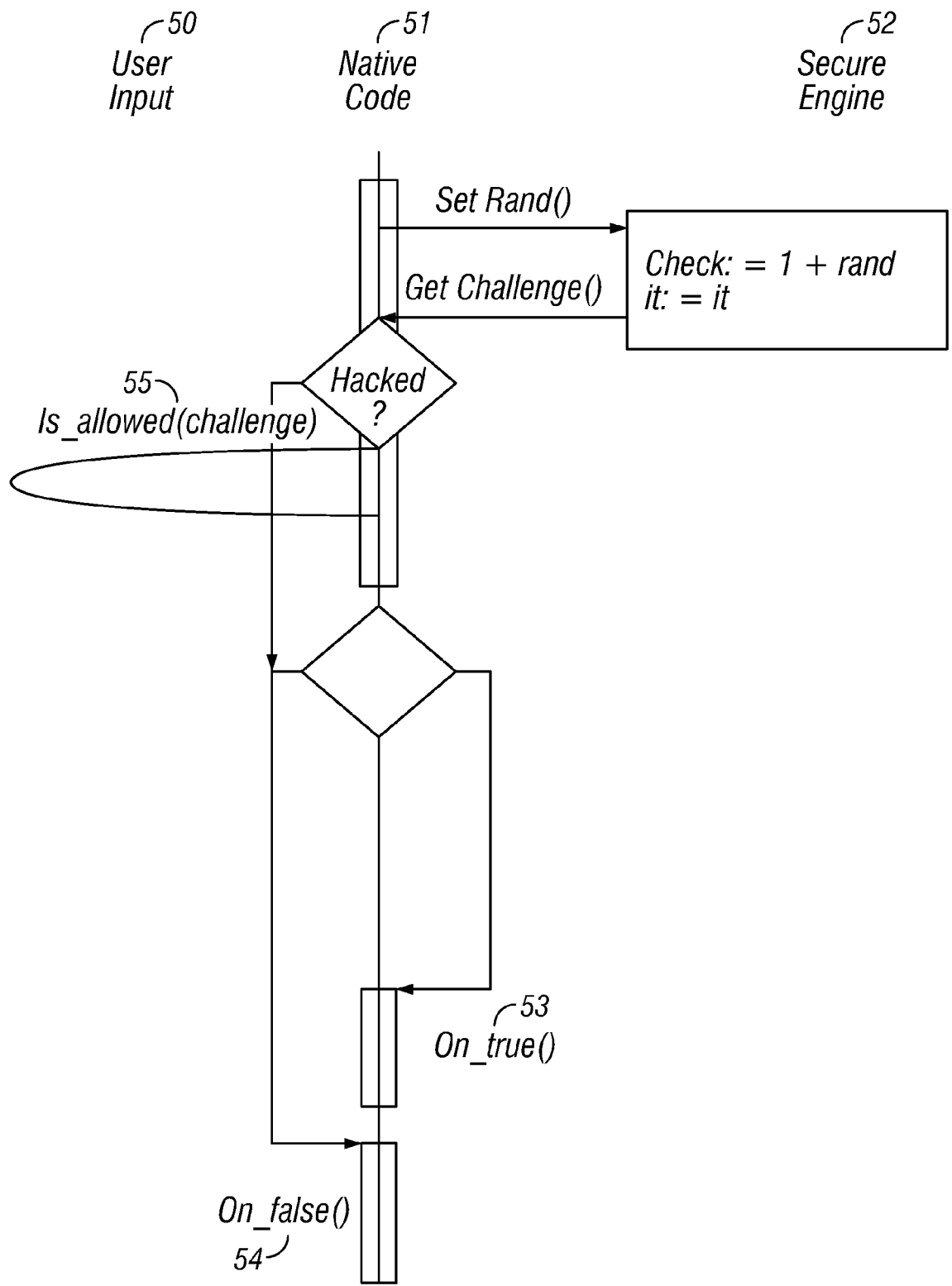
FIG. 5 is a flow diagram showing operation of a scripted IF antecedent according to the invention.

FIG. 5 is a flow diagram showing an example of operation of a scripted IF antecedent according to the invention. In FIG. 5, native code 51 is modified in accordance with embodiment of the invention by moving a challenge into the secure engine 52. A user interacts with the native code via various user inputs 50. If the code is not modified, then an Is_allowed (challenge) 55 and response executed in the secure engine returns code execution to call on_true( ) 53. If the memory is modified, then on_false( ) 54 is called, indicating that the code has been hacked.

Figure 6:
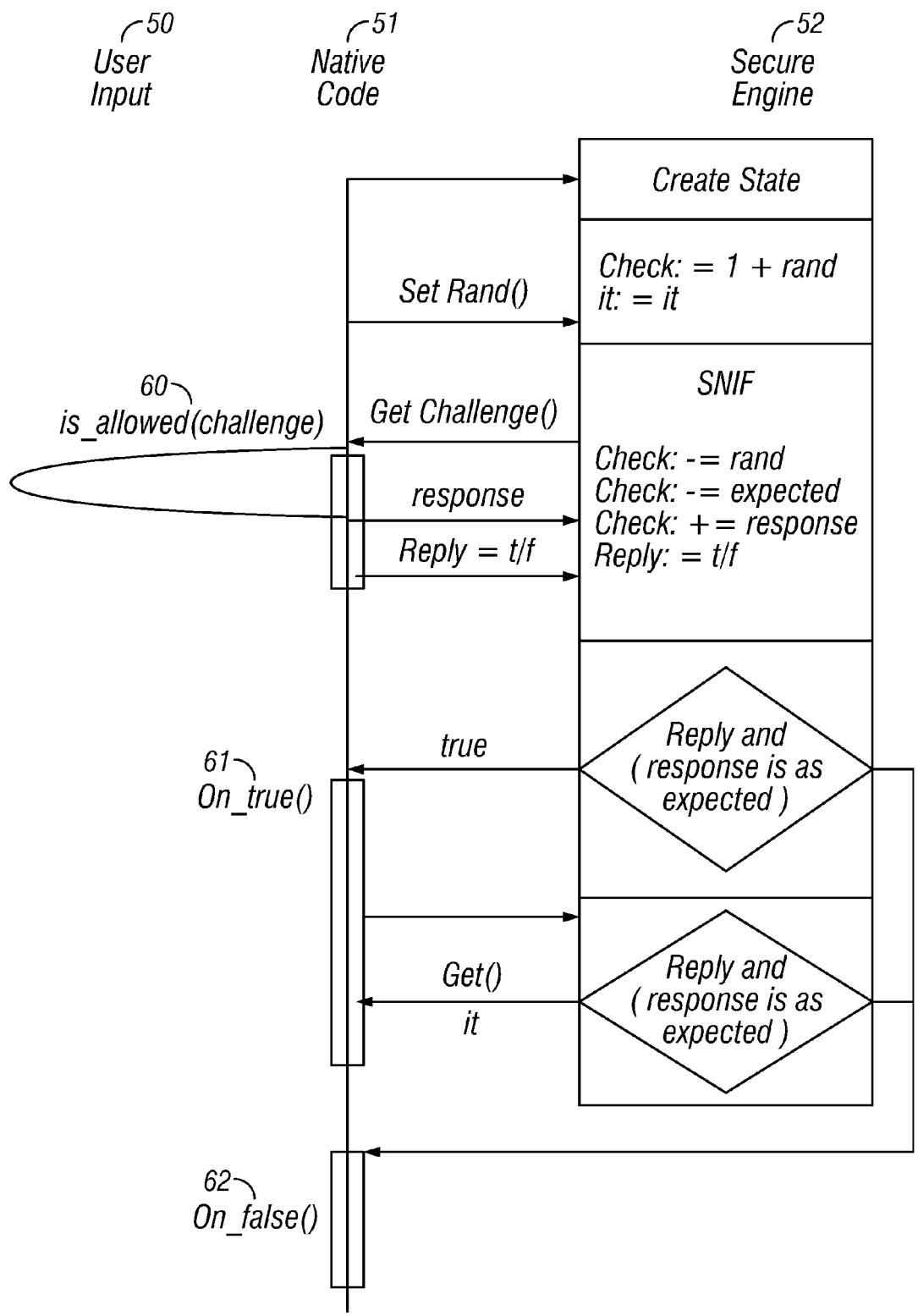
FIG. 6 is a flow diagram showing a second example of operation of a scripted IF antecedent according to the invention.

FIG. 6 is a flow diagram showing a second example of operation of a scripted IF antecedent according to the invention. In FIG. 6, two attacks are shown as follows:

Attack 1: jam return true from Is_allowed( ) 60 . . . On_false 61 called as response is not as expected.

Attack 2: jump to On_true( ) 61 skipping Is_allowed( ) 60 . . . On_false 61 called as Get( ) does not find response as expected.

Figure 7:
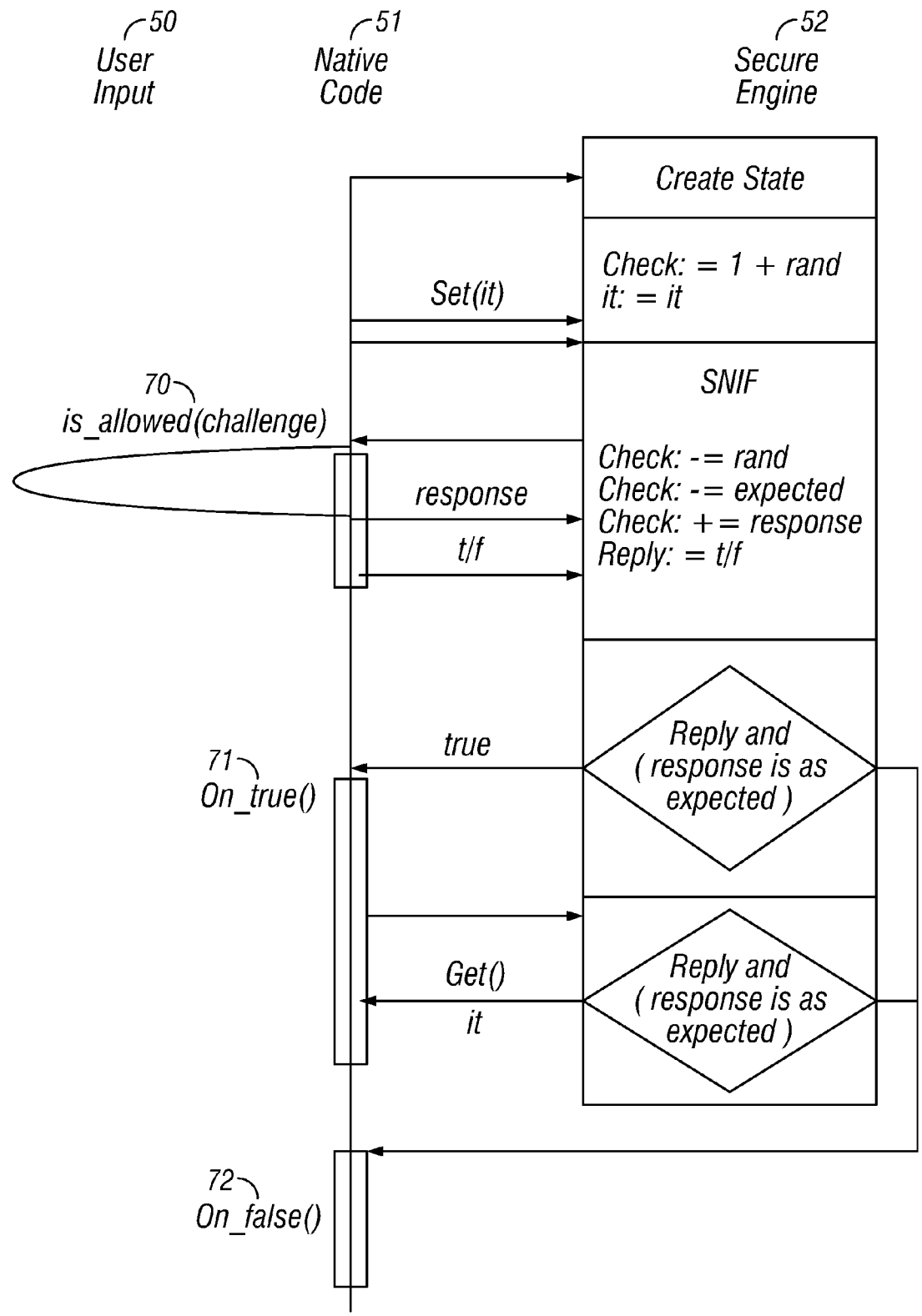
FIG. 7 is a flow diagram showing a second example of operation of a scripted IF antecedent according to the invention.

FIG. 7 is a flow diagram showing a third example of operation of a scripted IF antecedent according to the invention. In FIG. 7, two attacks are shown as follows:

Attack 1: jam return true from Is_allowed( ) 70 . . . On_false 72 called as response is not as expected.

Attack 2: jump to On_true( ) 72 skipping Is_allowed( ) 70 . . . On_false 71 called as Get( ) does not find response as expected.

Computer Implementation

Figure 8:
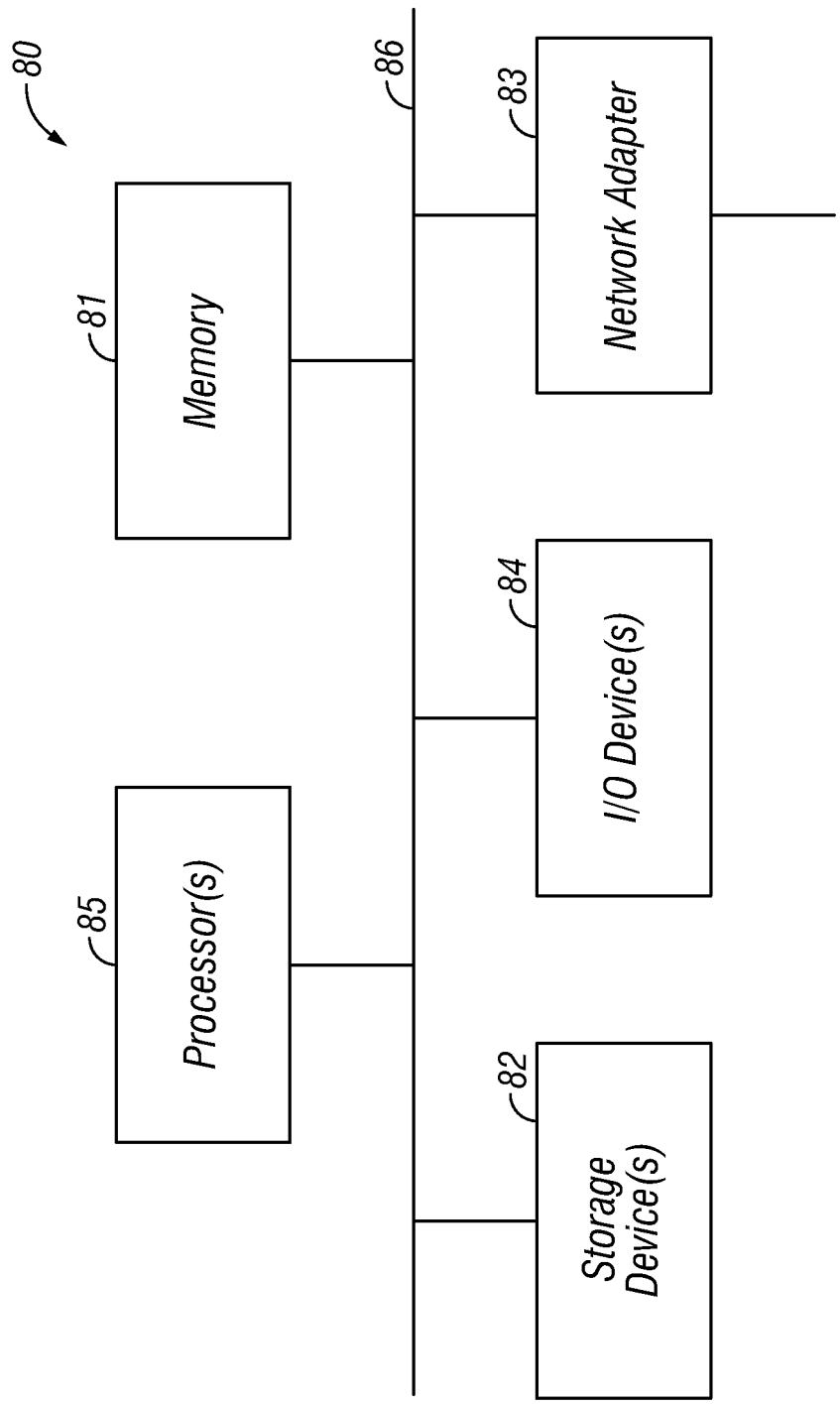
FIG. 8 is a block schematic diagram showing a machine in the example form of a computer system within which a set of instructions for causing the machine to perform one or more of the methodologies discussed herein may be executed.

FIG. 8 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 80 may include one or more central processing units ("processors") 85, memory 81, input/output devices 84, e.g. keyboard and pointing devices, touch devices, display devices, storage devices 82, e.g. disk drives, and network adapters 83, e.g. network interfaces, that are connected to an interconnect 86.

In FIG. 8, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 81 and storage devices 82 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 81 can be implemented as software and/or firmware to program one or more processors to carry out the actions described above. In some embodiments of the invention, such software or firmware may be initially provided to the processing system 80 by downloading it from a remote system through the computing system, e.g. via the network adapter 83.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for preventing hostile attacks against a computer program, comprising:
providing a processor executing instructions for running a preposition in a secure computing environment separate from an original call site within native program code of the computer program, said preposition comprising an IF antecedent having a TRUE consequence and a FALSE consequence;
said processor providing a different response for each consequence; and
said computer program executing the native program code in a computing environment that is controlled by an attacker;
said native program code providing a check value to a script in said secure computing environment and waiting for said script to return a value that is expected upon proper completion of the script; and
repeatedly providing a check value to said script in said secure computing environment during execution of the native program code with a series of calls to the script in said secure computing environment, where the check value is repeatedly changed by the native program code and where a different expected value is returned after each call; and wherein a hostile attack is detected when the check value returned by the call is not the expected value.

2. The method of claim 1, further comprising:

generating a script with a script engine from the IF antecedent and TRUE and FALSE consequence original source code relative to said original call site;

modifying said original source code to call the script engine, rather than the preposition; and executing said script with said script engine at run time.

3. The method of claim 2, further comprising:

said script defining actions to be executed after processing said IF antecedent.

4. The method of claim 2, further comprising:

said script instructing said script engine to validate any of its own address space or another module for modification.

5. The method of claim 2, further comprising:

encrypting said script using standard symmetric encryption algorithms with a key defined by an author.

6. The method of claim 2, further comprising:

declaring said script as a data field in the native program code of the computer program.

7. The method of claim 2, further comprising:

adding a series of keys to said script that serve as aliases for.

8. The method of claim 2, further comprising:

providing a check value, where the check value exists inside said secure computing environment; and modifying said check value depending on proper execution of the native program code.

9. The method of claim 2, further comprising:

using an obfuscated script engine with changeable operation codes.

10. The method of claim 2, further comprising:

said script engine evaluating results of said antecedent and calling the TRUE or FALSE consequence.

11. The method of claim 2, further comprising:

said TRUE or FALSE consequence calling said script engine.

12. The method of claim 2, further comprising:

said script engine verifying that the native program code has not been modified since being launched.

13. The method of claim 2, further comprising:

said script engine checking that the native program code has been modified to a new expected known value.

14. The method of claim 2, further comprising:

retaining state in the script engine to inter-lock the IF antecedent and the TRUE or FALSE consequence.

15. The method of claim 14, further comprising:

incrementally modifying the state by each stage of the IF antecedent and calling back; and using said state in the TRUE or FALSE consequence to perform a critical task.

16. The method of claim 2, further comprising:

either or both of said I F antecedent and said TRUE or FALSE consequence making further calls to test another IF antecedent; and altering behavior based on the success or otherwise of said calls.

17. The method of claim 2, further comprising:

said script following a different execution path on each execution of said script.

18. The method of claim 2, further comprising:

said script engine containing a state item that is addressable by multiple externally unrelated aliases.

19. The method of claim 1, further comprising:

checking sections of the native program code during runtime for unauthorized modifications made by the attacker.

20. The method of claim 1, further comprising:

said native program code calling into a script within said secure computing environment; and said script returning a value indicating proper execution of said native program code.

21. The method of claim 1, further comprising:

generating a script from source code of said preposition to call back to said source code for parts of the code that are not converted to a script when run in a script engine.

22. The method of claim 21, further comprising:

generating additional call backs where a negative or different result is expected.

23. A computer implemented method for preventing hostile attacks against a computer program, the method comprising:

providing specific instructions to a processor for running a preposition in a secure computing environment separate from an original call site within native program code of the computer program;

wherein the preposition is a segment of the native program code;

wherein the preposition comprises an IF antecedent having a TRUE consequence and a FALSE consequence; and wherein all references to the preposition are stripped from the native program code;

said processor providing distinct responses for the TRUE consequence and the FALSE consequence;

said computer program executing the native program code in a computing environment that is controlled by an attacker;

said native program code providing a check value to a script in said secure computing environment and waiting for said script to return a value that is expected upon proper completion of the script; and repeatedly providing a check value to said script in said secure computing environment during execution of the native program code with a series of calls to the script in the secure environment, where the check value is repeatedly changed by the native program code and where a different expected value is returned after each call; and wherein a hostile attack is detected when the check value returned by the call is not the expected value.

\* \* \* \* \*